United States Patent Office 3,284,392
Patented Nov. 8, 1966

3,284,392
ADHESIVE SOLUTION COMPRISING A PHENOL-FORMALDEHYDE RESIN AND A POLYURETHANE ELASTOMER IN A SOLVENT MIXTURE OF METHYLENE CHLORIDE AND AN AQUEOUS ETHYL ALCOHOL SOLUTION
Murray Steinfink, Claymont, Del., assignor to E. I. du Pont de Nemours and Company, Wilmington, Del., a corporation of Delaware
No Drawing. Filed Aug. 28, 1964, Ser. No. 392,929
6 Claims. (Cl. 260—29.3)

This invention relates to novel compositions of matter comprising solutions of thermoplastic secondary polyurethanes and thermosetting phenolic resins. These solutions can be employed to adhesively bond a wide variety of substances.

Adhesives comprising blends of elastomeric polymers and phenolic resins are widely known and used in the art of joining similar or dissimilar materials. Natural rubber and synthetic elastomers including neoprene and the various butadiene copolymer elastomers have been used. The superior properties of polyurethane elastomers have only recently been applied in this field. A particularly useful adhesive has been made by combining thermoplastic secondary polyurethanes with oil-soluble, non-thermosetting phenolic resins. Although this adhesive forms bonds having properties, without curing, which are characteristic of conventional cross-linked elastomers, many adhesive applications require a more permanent, high temperature-resistant bond than can be achieved with a composition compounded entirely of non-crosslinked polymers and resins. It is known that thermosetting phenolic resins provide improvement in these properties when incorporated into elastomer adhesive compositions in place of the thermoplastic phenolic resin. Unfortunately, the thermosetting phenolic resins are not soluble in any of the known solvents used to form adhesive solutions containing polyurethanes; the chlorinated hydrocarbons are examples of solvents in which thermoplastic polyurethane elastomers are soluble, but in which thermosetting phenolic resins are not. A way of obtaining a compatible mixture or solution of these elastomers and resins is therefore needed.

An object of the present invention is to provide such a solution. Other objects will appear hereinafter.

It has been discovered that a solvent medium of about 90 to 25 parts by weight of methylene chloride and about 10 to 75 parts by weight of 2-B alcohol (2-B alcohol is a standard denaturing formula for alcohol consisting of 91.75% by weight ethyl alcohol, about 0.5% by weight benzene, and the remainder water) will dissolve both thermoplastic secondary polyurethane elastomers and thermosetting phenolic resins so as to form a liquid adhesive composition. It is unexpected that this solution occurs for the reason that neither the elastomer nor the resin are both soluble in the methylene chloride or 2-B alcohol used separately.

The preferred mixture of the components is 25 to 75 parts by weight of the elastomer and 75 to 25 parts by weight of the resin, with the solvent medium containing up to about 30% of these solids based on the weight of the solvent medium. The lower limit on solids content will generally be that concentration which yields an adhesive bond upon evaporation of the solvent. This lower limit will vary with the composition of the solids employed and the method of application selected.

The thermoplastic secondary polyurethanes used in the preparation of the adhesive composition of this invention are essentially linear and soluble and are derived from three types of structural units employed in specific proportions. These structural units are

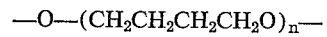

which is the bivalent radical of polytetramethylene ether glycol having the hydroxyl hydrogen atoms removed and wherein $n$ is the number of units needed to give a number average molecular weight of 800 to 3000 and

which is the bivalent radical of butanediol-1,4- having the hydroxyl hydrogen atoms removed, connected by the bivalent acyl radical

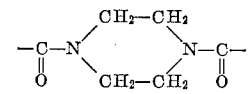

In general, the polyurethanes are obtained by reacting piperazine with the bis-chloroformates of polytetramethylene ether glycol (PTMEG) and butanediol-1,4 (BDO), with concomitant elimination of hydrogen chloride. The bis-chloroformates of the glycol and diol can be prepared by following known procedures such as by adding dropwise one molar proportion of the dihydroxy compound to four molar proportions of phosgene contained and agitated in a vessel held at about 0° C. and by allowing the reaction medium to warm to evaporate excess phosgene.

The preferred thermoplastic polyurethanes of this invention are prepared by reacting the bis-chloroformates of about 0.25 molar proportion of a PTMEG of number average molecular weight 1000, about 0.75 molar proportion of a PTMEG of number average molecular weight 2000, and about 4.0 molecular proportions of BDO with about 5.0 molar proportions of piperazine. The reaction can be carried out by known methods. A convenient method is to mix together with good agitation a solution of the bis-chloroformates in an inert solvent such as methylene chloride and an aqueous solution of piperazine containing sufficient acid acceptor such as sodium carbonate to neutralize the HCl formed by the condensation reaction of the acid halide and amine groups. The resulting polymer, dissolved in the organic solvent, is separated from the aqueous phase, washed free of salts, and the polymer isolated by flashing or steam distilling the organic solvent. Such a procedure is discussed in more detail in the U.S. Patent 2,929,802.

The thermosetting phenolic resin components suitable for use in the adhesive composition of this invention are well-known commercial products. They are any of the condensation products having a molecular weight of about 400 to 500 of phenol and formaldehyde prepared in the presence of an acid catalyst. These products are generally known as "heat-reactive" resins, because upon heat treatment in the presence of a suitable catalyst, they are converted from their original soluble, low molecular weight form ("A-stage") to an insoluble, heat-resistant ("B-stage") condition. A typical resin found particularly suitable for the adhesive compositions of this invention is the commercial product "Durez" phenolic resin 21581. A suitable catalyst for the curing step is hexamethylene tetramine (HMT). "Durez" 21582, another commercial product, contains about 7.4% by weight of HMT based on the weight of the resin as supplied and is found to be a satisfactory resin component. Additional HMT may be incorporated in the adhesive composition if necessary to provide an optimum rate and state of cure of the adhesive bond to be formed. As much as 16% by weight HMT can be used, although about 8% HMT has been found to be an especially suitable concentration.

The elastomer and phenolic resin components hereinbefore described are both dissolved in the defined methylene chloride-2-B alcohol solvent in order to prepare the adhesive compositions of the present invention. Whereas, solvent-free adhesive compositions can be prepared with thermoplastic polyurethane elastomers and thermoplastic oil-soluble phenolic resins, such is not practicable when thermosetting phenolic resins are used because of the high viscosity of both the elastomer and the thermosetting resin. Mechanical mixing of these materials on a mill or in an internal mixer generates heat which generally at least partially prematurely cures the thermosetting resin component. In addition, the resulting mixture is too viscous to be readily applied to surfaces to be bonded. Thus, the discovery of a solvent medium for both the elastomer and the resin enables these difficulties and disadvantages to be overcome. The fact that this medium is a solvent for both the elastomer and the resin is surprising since the phenolic resins are insoluble in pure methylene chloride and the polyurethanes are insoluble in alcohols. Concentrations of methylene chloride from 95 to 25 parts by weight and of 2-B alcohol from 5 to 75 parts by weight may be used but from 90 to 25 and from 5 to 75 parts by weight of these respective components are preferred to yield a particularly desirable adhesive system with the elastomer and resin contents previously described. These concentrations of methylene chloride and 2-B alcohol are per 100 parts by weight of total solvent. As much as about 30% by weight total solids components may be dissolved in this solvent medium; 15–25% is a preferred range. A low viscosity is desirable for ready application of the adhesive composition, and it is found that about 1:1 weight proportions of methylene chloride and 2-B alcohol give a composition of minimum viscosity when 20% solids solutions of equal parts of the polymer and resin components are used, as illustrated in Table I.

TABLE I.—VISCOSITY OF POLYURETHANE/RESIN [1] COMPOSITIONS

| $CH_2Cl_2$, percent | 2-B Alcohol, percent | Viscosity cps. at 24° C. |
|---|---|---|
| 90 | 10 | 1,000 |
| 50 | 50 | 320 |
| 25 | 75 | 1,720 |

[1] 20% solids, equal parts of polyurethane and "Durez" 21582.

While a blend of equal parts of the polyurethane and phenolic resin has been found quite suitable, the mixture can conveniently range from 25–75 parts by weight of polyurethane, the remainder being the phenolic resin. Antioxidants are not essential for many applications but may be incorporated into the adhesive composition or into the polyurethane elastomer during or after its preparation. Amounts such as ½ to 2% by weight based on the weight of the solid components of the adhesive are sufficient. U.S. Patent No. 2,929,802 discloses numerous antioxidants which are suitable.

The adhesive compositions of this invention are applied by brushing, coating, impregnation, or the like in the manner of conventional adhesive solutions and are excellent for bonding both porous and non-porous materials, such as woven and non-woven fabrics, wood, leather, steel, aluminum, and other metals. They are particularly useful as structural adhesives in bonding metal structural elements. They are normally cured by heating the glue or bonding layer under pressure at a temperature of 125° to 225° C.

The following examples are illustrative of this invention. Parts and percents are by weight unless otherwise noted.

*Examples.—Sample preparation and testing*

The solutions used in preparing structural adhesive bonds from blends of thermoplastic polyurethane with "Durez" 21581 and/or "Durez" 21582 are prepared by mixing:

25–75 parts by weight of thermoplastic polyurethane having the composition prepared by reacting the bischloroformates of about 0.25 molar proportion of a PTMEG of number average molecular weight 1000, 0.75 molar proportion of a PTMEG of number average molecular weight 2000, and 4.0 molecular proportions of (BDO) with 5.0 molar proportions of piperazine;
75–25 parts by weight of either "Durez" 21581 or "Durez" 21582, the latter containing 7.4% by weight of HMT;
1000 parts by weight of methylene chloride; and
110 parts by weight of 2-B alcohol.

MHT catalyst as reported in the following examples.

The metal objects to be bonded together are made of aluminum. They are degreased and then cleaned in a chromic acid solution (made by mixing 30 parts water with 10 parts sulfuric acid and 1 part of sodium dichromate) for 10 minutes at 66° C. If steel is used in place of aluminum the steel surfaces are sand blasted.

The adhesive is applied to the metal substrate by brush coating. As many brush coats as necessary are applied in order to obtain a 5 mil dry adhesive film on a 1″ x ½″ area. The adhesive is dried at room temperature for 15 minutes between coats and 2 days after the last coat. It is applied to both substrates being adhered. Films are prepared by solution casting in a glass mold. Ten mil films (dry basis) are produced in this manner and dried at room temperature for at least two days before using.

The coated substrates are then placed together and cured in a press. The specimens are conditioned at room temperature and 50% R.H. for two days before being tested. If they are tested at a temperature other than room temperature, they are conditioned at this temperature for at least 10 minutes prior to testing. The samples are tested in shear at 180° unless otherwise indicated.

Films .015 inch thick are used in determining the stress/strain properties of these blends. These films are solution cast in the manner previously described and then cured by compression molding in a .015 inch thick picture frame mold at 177° C. under 625 p.s.i. pressure for the indicated time. The samples are conditioned 2 days at room temperature and 50% R.H. before testing.

*Example 1*

Table: Effect of polyurethane/"Durez" 21582 ratio on shear strength.

| Composition | | 180° Shear Strength, p.s.i. |
|---|---|---|
| Polyurethane, parts | "Durez" 21582, parts | |
| 100 | 0 | 920 |
| 75 | 25 | 2,130 |
| 50 | 50 | 3,600 |
| 25 | 75 | 2,400 |
| 0 | 100 | 950 |

Cure: 177° C. for 1 hour under 100 p.s.i. using ½″ overlap.
Shear speed: 2″/minute.

*Example 2*

Table: Effect of amount of hexamethylene tetramine (HMT) used in curing "Durez" 21581 on the shear strength of a 50/50 blend of "Durez" 21581/polyurethane.

HMT parts:                   180° shear strength, p.s.i.
  0 ------------------------------------ 400
  4 ------------------------------------ 2400
  8 ------------------------------------ 3100
 16 ------------------------------------ 2900

Cure: 177° C. for 1 hour under 200 p.s.i. using a ½″ overlap.
Shear speed: 0.2″/minute.

Example 3

Table: Stress/strain properties of polyurethane blends with "Durez" 21582

| Polyurethane/"Durez" 21582 Ratio | 100/0 | 50/50 | 100/0 | 75/25 | 50/50 | 25/75 | 0/100 |
|---|---|---|---|---|---|---|---|
| Cure time, minutes | 10 | 10 | 20 | 20 | 20 | 20 | 20 |
| Shore Hardness A/D at 25° C | 80/- | -/68 | 85/- | 89/45 | -/71 | -/78 | |
| Test at 25° C.: | | | | | | | |
| $M_{100}$, p.s.i | 825 | 5,300 | 850 | 1,550 | | | Brittle. |
| $M_{300}$, p.s.i | 1,250 | | 1,300 | 2,600 | | | Do. |
| $T_B$, p.s.i | 6,300 | 5,300 | 6,400 | 7,000 | 7,000 | 2,100 | Do. |
| $E_B$, percent | 780 | 100 | 670 | 510 | 50 | 0 | Do. |
| $PS_B$, percent | 93 | 50 | | | | | Do. |
| D-470 tear, p.s.i | 126.8 | 61.2 | 110.9 | 126.1 | 39.1 | | Do. |

Cure: 177° C. for specified time in compression mold using 625 p.s.i. pressure.

Other thermoplastic polyurethane elastomers and thermosetting phenolic resins may be employed in the foregoing examples, and similar results will be obtained.

As many widely different embodiments of this invention may be made without departing from the spirit and scope thereof, it is to be understood that this invention is not limited to the specific embodiments thereof except as defined in the appended claims.

What is claimed is:

1. A fluid adhesive composition comprising a solvent medium consisting essentially of about 90 to 25 parts by weight of methylene chloride and about 10 to 75 parts by weight of an alcohol consisting of 91.75% by weight ethyl alcohol, about 0.5% by weight benzene, and the remainder water, said solvent medium containing up to about 30% by weight of dissolved solids which consist essentially of 25 to 75 parts by weight of a thermoplastic secondary polyurethane elastomer and 75 to 25 parts by weight of a thermosetting phenol/formaldehyde resin, said thermoplastic secondary polyurethane elastomer consisting essentially of the units

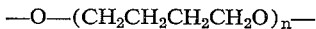

wherein $n$ is the number of units required to give a number average molecular weight of 800 to 3000 and —O—$(CH_2)_4$—O— connected by the bivalent acyl radical

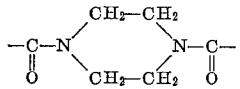

with the units —O—$(CH_2)_4$—O— being present in the amount of 4 moles per mole of the first mentioned units.

2. The fluid adhesive composition as recited in claim 1 wherein said solvent medium contains from 15 to 25% by weight of said dissolved solids.

3. The fluid adhesive composition as recited in claim 1 wherein the weight proportion of said methylene chloride and said alcohol is about 1:1.

4. The fluid adhesive composition as recited in claim 1 wherein said units —O—$(CH_2CH_2CH_2CH_2O)_n$— consist of 0.25 molar proportion of molecular weight of 1000 and 0.75 molar proportion of molecular weight of 2000.

5. The fluid adhesive composition as recited in claim 1 containing a catalytic amount of an agent for curing said resin.

6. The fluid adhesive composition as recited in claim 5 wherein said agent is hexamethylene tetramine.

References Cited by the Examiner

UNITED STATES PATENTS

| | | | |
|---|---|---|---|
| 2,662,865 | 12/1953 | Beauchamp | 260—29.3 |
| 2,817,643 | 12/1957 | Altner | 260—33.8 |
| 3,036,979 | 5/1962 | Wittbecker | 260—33.8 |

MURRAY TILLMAN, *Primary Examiner.*

J. C. BLEUTGE, *Assistant Examiner.*